(12) United States Patent
Kasai et al.

(10) Patent No.: US 11,927,934 B2
(45) Date of Patent: Mar. 12, 2024

(54) CUTTING APPARATUS CAPABLE OF DETECTING CONFIGURATION ABNORMALITIES OF A CUTTING BLADE

(71) Applicant: DISCO CORPORATION, Tokyo (JP)

(72) Inventors: Tsuyoshi Kasai, Tokyo (JP); Ayako Koike, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 756 days.

(21) Appl. No.: 17/081,032

(22) Filed: Oct. 27, 2020

(65) Prior Publication Data

US 2021/0132567 A1 May 6, 2021

(30) Foreign Application Priority Data

Oct. 31, 2019 (JP) ................................. 2019-199349

(51) Int. Cl.
*G05B 19/402* (2006.01)
*G05B 19/18* (2006.01)

(52) U.S. Cl.
CPC ......... *G05B 19/182* (2013.01); *G05B 19/402* (2013.01); *G05B 2219/45044* (2013.01)

(58) Field of Classification Search
CPC ............... G05B 19/182; G05B 19/402; G05B 2219/45044; G05B 2219/37256; G05B 2219/45031; G05B 2219/49226; G05B 2219/50203; G05B 19/4065; B23D 59/001; B23D 63/18; B28D 5/024; H01L 21/67092; B23Q 3/06; B24B 27/0616; B24B 49/12
See application file for complete search history.

(56) References Cited

U.S. PATENT DOCUMENTS

| | | | | |
|---|---|---|---|---|
| 5,031,360 A | * | 7/1991 | Farnworth | B23D 59/001 451/6 |
| 2003/0082995 A1 | * | 5/2003 | Cohen | B28D 5/022 451/6 |

FOREIGN PATENT DOCUMENTS

| | | | |
|---|---|---|---|
| JP | 1055985 A | | 2/1998 |
| JP | H1055987 A | * | 2/1998 |
| JP | 2012111003 A | * | 6/2012 |

(Continued)

OTHER PUBLICATIONS

Morooka Masaya, JP-H1055987-A, 1998, English translation (Year: 1998).*

(Continued)

*Primary Examiner* — Eric J Yoon
*Assistant Examiner* — Jonathan Michael Skrzycki
(74) *Attorney, Agent, or Firm* — Greer Burns & Crain Ltd.

(57) ABSTRACT

A cutting apparatus includes a management unit having a measuring unit for measuring an amount of light emitted from a light emitter and received by a light receiver while a cutting blade is positioned between the light emitter and the light receiver, a measured waveform forming section for forming a measured waveform representing the configuration of an outer circumferential region of the cutting blade, and an ideal waveform recognizing section for recognizing one of the comparative waveforms that has the greatest number of waveform regions similar to the measured waveform as an ideal waveform, a difference calculating section for calculating the area of a region where there is a difference between the measured waveform and the ideal waveform.

2 Claims, 7 Drawing Sheets

(56) References Cited

FOREIGN PATENT DOCUMENTS

JP          5934582 B2 * 6/2016
JP     2019168412 A * 10/2019

OTHER PUBLICATIONS

Yamaguchi T, JP-2019168412-A, published Oct. 3, 2019, English translation (Year: 2019).*
Aramaki S, JP-2012111003-A, 2012, English translation (Year: 2012).*
Ozawa M, JP-5934582-B2, 2016, English Translation (Year: 2016).*

* cited by examiner

CUTTING APPARATUS CAPABLE OF DETECTING CONFIGURATION ABNORMALITIES OF A CUTTING BLADE

BACKGROUND OF THE INVENTION

Field of the Invention

The present invention relates to a cutting apparatus with a cutting blade mounted therein.

Description of the Related Art

There have been used in the art cutting apparatuses for cutting a workpiece with a cutting blade, dividing the workpiece into individual device chips (see, for example, Japanese Patent Laid-Open No. Hei 10-055985). The cutting apparatus disclosed in Japanese Patent Laid-Open No. Hei 10-055985 is required to dress the cutting blade by periodically having its cutting edge cut into a dressing board in order to keep the center of rotation of the cutting blade and the center of the outer edge of the cutting edge in alignment with each other.

SUMMARY OF THE INVENTION

However, in the case where the cutting blade is unevenly worn or otherwise deformed, the conventional cutting apparatus is unable to eliminate the deformation of the cutting blade even by dressing the cutting edge, and may possibly result in a reduction of the processing quality achieved by the cutting blade. The conventional cutting apparatus is problematic in that it fails to detect a configurational abnormality of the outer circumferential region of the cutting blade due to deformation thereof.

It is therefore an object of the present invention to provide a cutting apparatus that is capable of detecting a configurational abnormality of the outer circumferential region of a cutting blade thereof.

In accordance with an aspect of the present invention, there is provided a cutting apparatus including a chuck table for holding a workpiece thereon, a cutting unit for cutting the workpiece held on the chuck table with a cutting blade mounted on a spindle, and a management unit for managing the cutting blade mounted on the spindle. The management unit includes a light emitter, a light receiver facing the light emitter, for receiving light emitted from the light emitter, a measuring unit for measuring an amount of light emitted from the light emitter and received by the light receiver while the cutting blade is positioned between the light emitter and the light receiver, a measured waveform forming section for forming a measured waveform representing the configuration of an outer circumferential region of the cutting blade from the amount of light measured at a plurality of rotational angles of the cutting blade, a comparative waveform forming section for forming a plurality of comparative waveforms representing the configurations of the outer circumferential region of the cutting blade, on the basis of amounts of light measured by the measuring unit, in the case where the cutting blade is mounted on the spindle with respective desired eccentricities, an ideal waveform recognizing section for recognizing a comparative waveform that has the greatest number of waveform regions similar to the measured waveform as an ideal waveform, among the plurality of comparative waveforms formed by the comparative waveform forming section using the respective eccentricities that are varied stepwise by the ideal waveform recognizing section, a difference calculating section for calculating the area of a region where there is a difference between the measured waveform and the ideal waveform that are superposed on each other, and a determining section for determining that the configuration of the cutting blade is abnormal if the difference exceeds a threshold value.

In accordance with another aspect of the present invention, there is provided a cutting apparatus including a chuck table for holding a workpiece thereon, a cutting unit for cutting the workpiece held on the chuck table with a cutting blade mounted on a spindle, and a management unit for managing the cutting blade mounted on the spindle. The management unit includes a light emitter for emitting light, a light receiver facing the light emitter, for receiving the light emitted from the light emitter, a measuring unit for measuring an amount of light emitted from the light emitter and received by the light receiver while the cutting blade is positioned between the light emitter and the light receiver, a measured waveform forming section for forming a measured waveform representing the configuration of an outer circumferential region of the cutting blade from the amount of light measured at a plurality of rotational angles of the cutting blade, an ideal waveform forming section for forming an ideal waveform representing the configuration of the outer circumferential region of the cutting blade in the case where the cutting blade is mounted on the spindle with a predetermined eccentricity, a difference calculating section for calculating the area of a region where there is a difference between the measured waveform and the ideal waveform that are superposed on each other, and a determining section for determining that the configuration of the cutting blade is abnormal if the difference exceeds a threshold value. The ideal waveform forming section calculates an intermediate value between a maximum value and a minimum value of the measured waveform, and forms a waveform whose amplitude is represented by the difference between the intermediate value and the maximum value and between the intermediate value and the minimum value, depending on the eccentricity of the cutting blade, as the ideal waveform.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will hereinafter be described in detail below with reference to the drawings. The present invention is not limited to the details of the embodiments described below. The components described below cover those which could easily be envisaged by those skilled in the art and those which are essentially identical to those described above. Further, the arrangements described below can be used in appropriate combinations. Various omissions, replacements, or changes of the arrangements may be made without departing from the scope of the present invention.

First Embodiment

A cutting apparatus according to a first embodiment of the present invention will be described below with reference to FIGS. 1 through 6.

Figure 1:
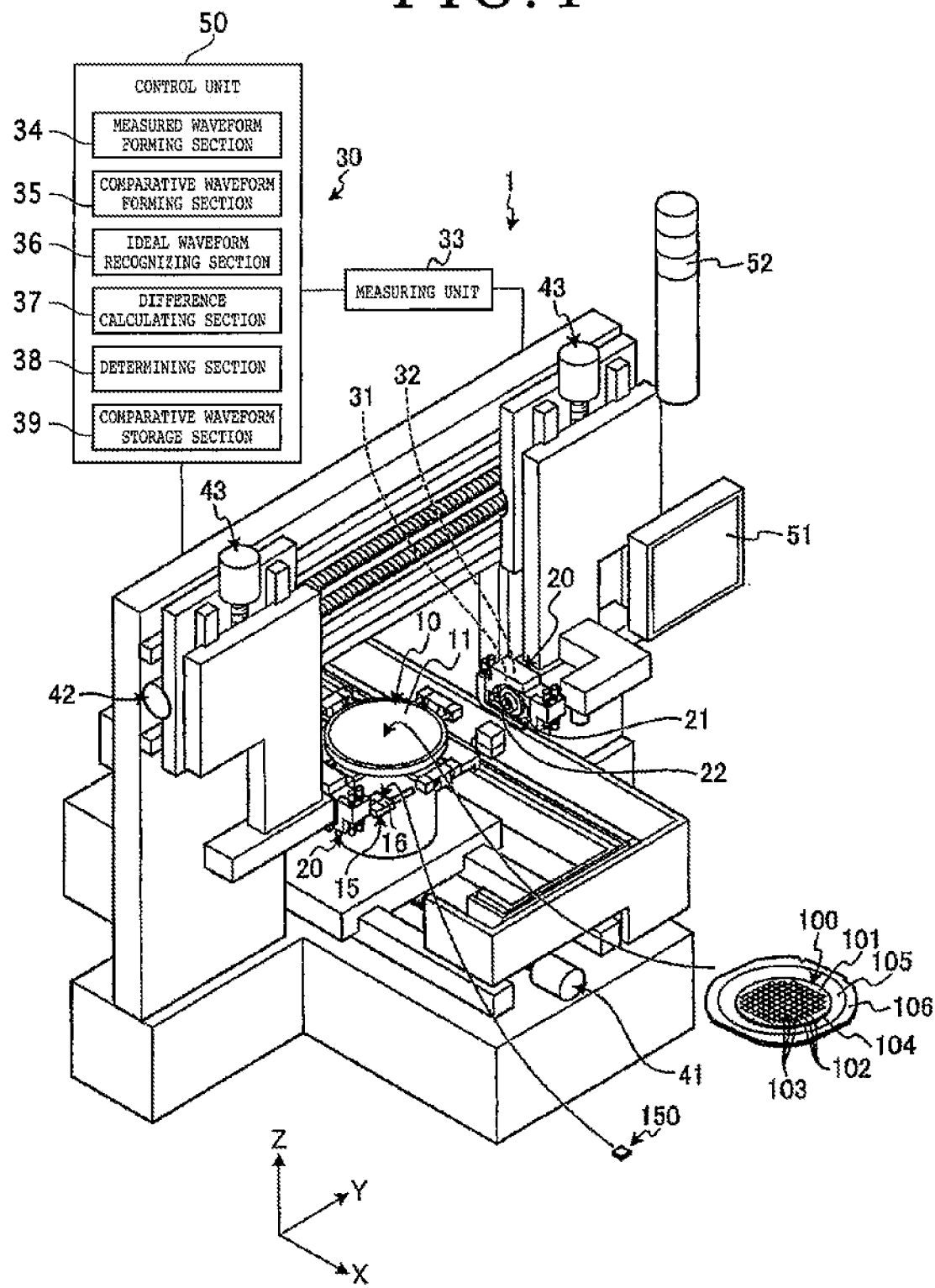
FIG. 1 is a perspective view illustrating a structural example of a cutting apparatus according to a first embodiment of the present invention.

As illustrated in FIG. 1, the cutting apparatus, denoted by 1, according to the first embodiment is an apparatus for cutting a workpiece 100. According to the first embodiment, the workpiece 100 to be cut by the cutting apparatus 1 refers to a wafer such as a semiconductor wafer or an optical device wafer that is shaped as a circular plate made of a base material of silicon, sapphire, gallium arsenide, or the like, for example. The workpiece 100 has a grid of intersecting projected dicing lines 102 on a flat face side 101 thereof and a plurality of devices 103 formed in respective areas demarcated on the face side 101 by the projected dicing lines 102. The workpiece 100 has a reverse side 104 opposite to the face side 101 with an adhesive tape 105 affixed to the reverse side 104. The adhesive tape 105 has an outer edge portion on which an annular frame 106 is mounted. According to the present invention, the workpiece 100 may alternatively be a rectangular packaged substrate, ceramic plate, glass plate, or the like having a plurality of resin-encapsulated devices thereon.

As illustrated in FIG. 1, the cutting apparatus 1 includes a chuck table 10, a pair of cutting units 20, and a management unit 30. The chuck table 10 holds the reverse side 104 of the workpiece 100 under suction on a holding surface 11 thereof with the adhesive tape 105 interposed between the reverse side 104 of the workpiece 100 and the holding surface 11. The cutting units 20 cut the workpiece 100 held under suction on the chuck table 10 with respective cutting blades 21 that rotate about their central axes. The cutting apparatus 1 include an X-axis moving unit 41, a Y-axis moving unit 42, and a pair of Z-axis moving units 43 that move the workpiece 100 on the chuck table 10 and the cutting blades 21 relatively to each other along the projected dicing lines 102 on the workpiece 100, cutting the workpiece 100 along the projected dicing lines 102. As illustrated in FIG. 1, the cutting apparatus 1 is a two-spindle dicing saw, i.e., a facing dual-type cutting apparatus with the two cutting units 20.

The cutting apparatus 1 also includes a sub-chuck table 15. The sub-chuck table 15 is disposed in a position adjacent to the chuck table 10 and holds a dressing board 150 under suction on a holding surface 16 thereof. The dressing board 150 is used in a dressing step for dressing the cutting blades 21 to increase the processing quality achieved by the cutting blades 21, by cutting the dressing board 150 by the cutting blades 21 so as to positively wear them.

Figure 2:
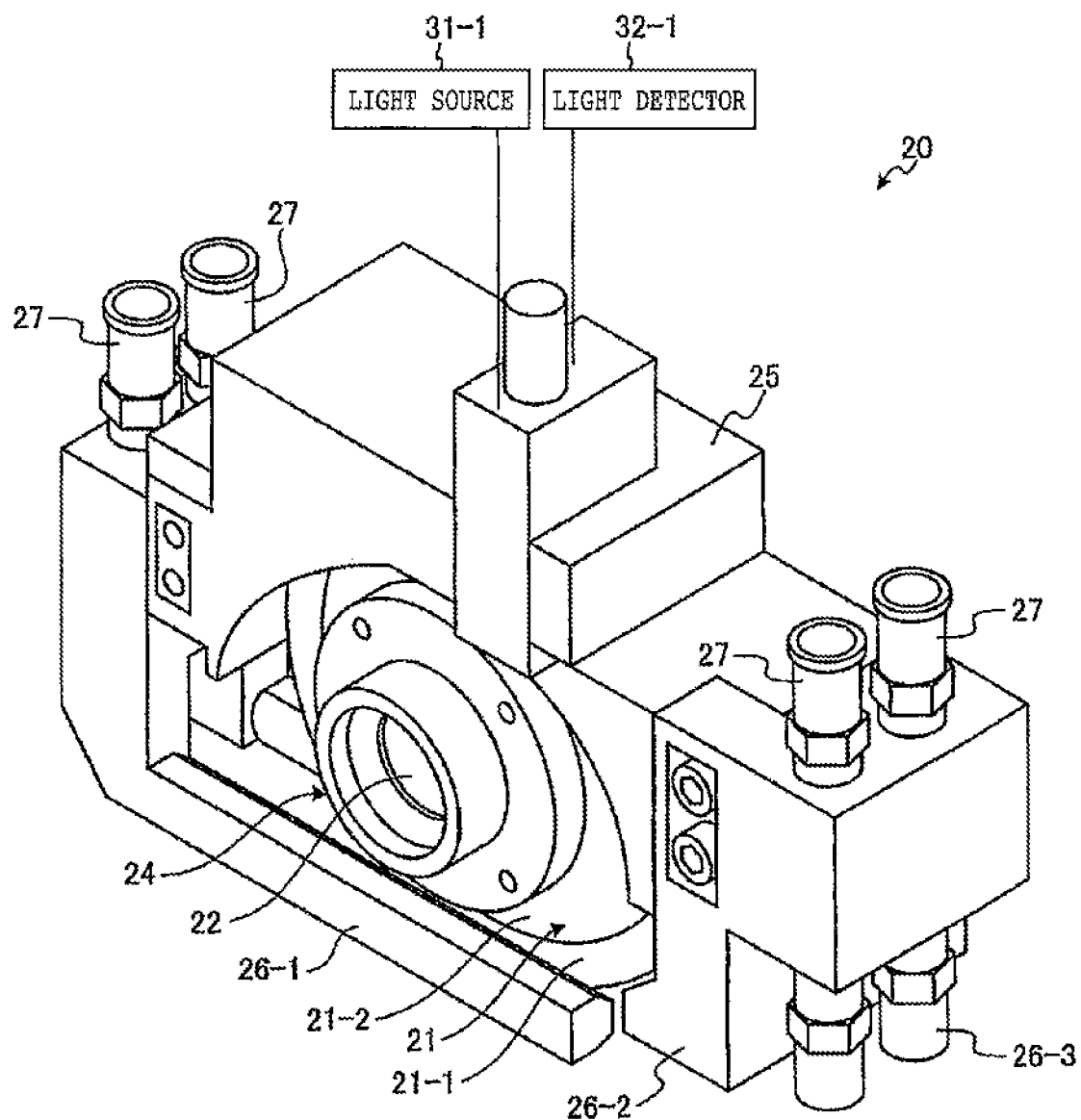
FIG. 2 is a perspective view illustrating a structural example of a cutting unit of the cutting apparatus illustrated in FIG. 1.
Figure 3:
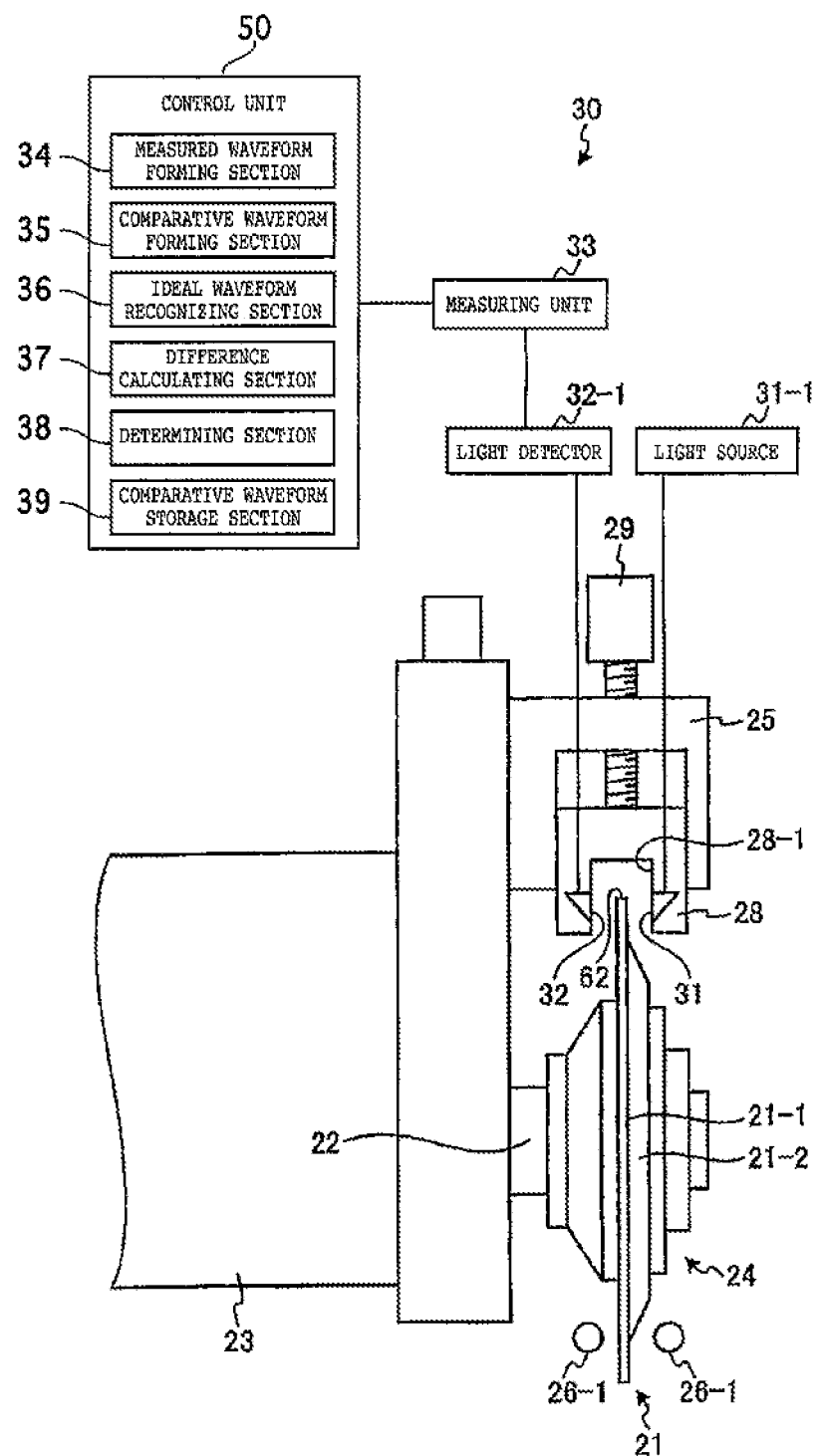
FIG. 3 is a side elevational view of the cutting unit of the cutting apparatus illustrated in FIG. 1, with a management unit thereof illustrated in block form.

As illustrated in FIGS. 2 and 3, each of the cutting units 20 includes the cutting blade 21, a spindle 22, a spindle housing 23, a blade mount 24, a blade cover 25, fluid supply nozzles 26-1, 26-2, and 26-3, fluid source joints 27, a grooved member 28, and a lifting and lowering member 29.

The cutting blade 21 is fixed to the distal end of the spindle 22 by the blade mount 24. The cutting blade 21 cuts the workpiece 100 when rotated by the spindle 22 acting as a rotational shaft. According to the first embodiment, the cutting blade 21 is a hub blade having an annular cutting edge 21-1 and a disk-shaped base 21-2, as illustrated in FIGS. 2 and 3. The cutting edge 21-1 is mounted on an outer circumferential edge of the base 21-2 and protrudes radially outwardly from an outer circumferential portion of the base 21-2. The cutting edge 21-1 is made of abrasive grains of diamond, cubic boron nitride (CBN), or the like and a bonding material, i.e., a binder, of a metal, a resin, or the like, and has a predetermined thickness. The base 21-2 is of an annular shape having an insertion hole 61 (see FIG. 5) defined centrally therein and fixedly fitted over the blade mount 24. The base 21-2 is made of a metal such as an aluminum alloy. According to the present invention, the cutting blade 21 is not limited to a hub blade and may be a hubless blade including only the cutting edge 21-1 with the insertion hole 61 defined therein.

As illustrated in FIG. 3, the spindle 22 is rotatably housed in the spindle housing 23 for rotation about a central axis along a Y-axis direction (see FIG. 1). The distal end of the spindle 22 protrudes out of an end of the spindle housing 23. The spindle 22 has a proximal end coupled to an electric motor, not illustrated, that rotates the spindle 22. The spindle 22 acts as the rotational shaft of the cutting blade 21. The blade mount 24 includes a pair of flanges shaped as circular plates that grip the cutting blade 21 therebetween and a tubular boss inserted in the insertion hole 61 in the base 21-2 and mounted on the distal end of the spindle 22, so that the cutting blade 21 is mounted on the distal end of the spindle 22 for rotation about its central axis.

The blade cover 25 is mounted on the distal end of the spindle housing 23 in covering relation to upper, front, and rear portions of the cutting blade 21. The blade cover 25 has a plurality of fluid channels defined therein. As illustrated in FIG. 2, the fluid supply nozzles 26-1, 26-2, and 26-3 are connected to lower ends of the fluid channels, and the fluid source joints 27 are connected to upper ends of the fluid channels. The fluid supply nozzles 26-1 supply a cutting fluid supplied from the fluid source joints 27 to side portions of the cutting edge 21-1 of the cutting blade 21. The fluid supply nozzles 26-2 supply the cutting fluid supplied from the fluid source joints 27 to the front portion of the cutting edge 21-1 of the cutting blade 21. The fluid supply nozzles 26-3 supply the cutting fluid supplied from the fluid source joints 27 to a portion of the workpiece 100 that is positioned forwardly with respect to the cutting edge 21-1 of the cutting blade 21. The cutting fluid may be pure water, for example.

As illustrated in FIG. 3, the grooved member 28 has a groove 28-1 defined therein that is wider than the thickness of the cutting edge 21-1 of the cutting blade 21. The grooved member 28 has a pair of side walls one on each side of the groove 28-1. The grooved member 28 is mounted on the blade cover 25 above the cutting blade 21 such that the cutting edge 21-1 has an upper end disposed in the groove 28-1 between the side walls of the grooved member 28. The lifting and lowering member 29 lifts and lowers the grooved member 28.

As illustrated in FIGS. 1 and 3, the management unit 30 includes a light emitter 31, a light receiver 32, a measuring unit 33, and a control unit 50. The control unit 50 includes a measured waveform forming section 34, a comparative waveform forming section 35, an ideal waveform recognizing section 36, a difference calculating section 37, a determining section 38, and a comparative waveform storage section 39.

As illustrated in FIG. 3, the light emitter 31 is mounted on one of the side walls of the grooved member 28 and emits light toward the other side wall. The light emitter 31 is optically connected to a light source 31-1 by an optical fiber or the like and emits light from the light source 31-1. The light receiver 32 is mounted on the other side wall of the grooved member 28 at a position facing the light emitter 31 and receives the light emitted from the light emitter 31. A light detector 32-1 is optically connected to the light receiver 32 by an optical fiber or the like and detects the light received by the light receiver 32.

As illustrated in FIG. 3, the measuring unit 33 is electrically connected to the light detector 32-1 and measures the amount of light emitted from the light emitter 31 and received by the light receiver 32 while the cutting blade 21 is positioned between the light emitter 31 and the light receiver 32. The measuring unit 33 is electrically connected to the control unit 50, to be described in detail below, and sends information representing the measured amount of light to the control unit 50.

Figure 4:
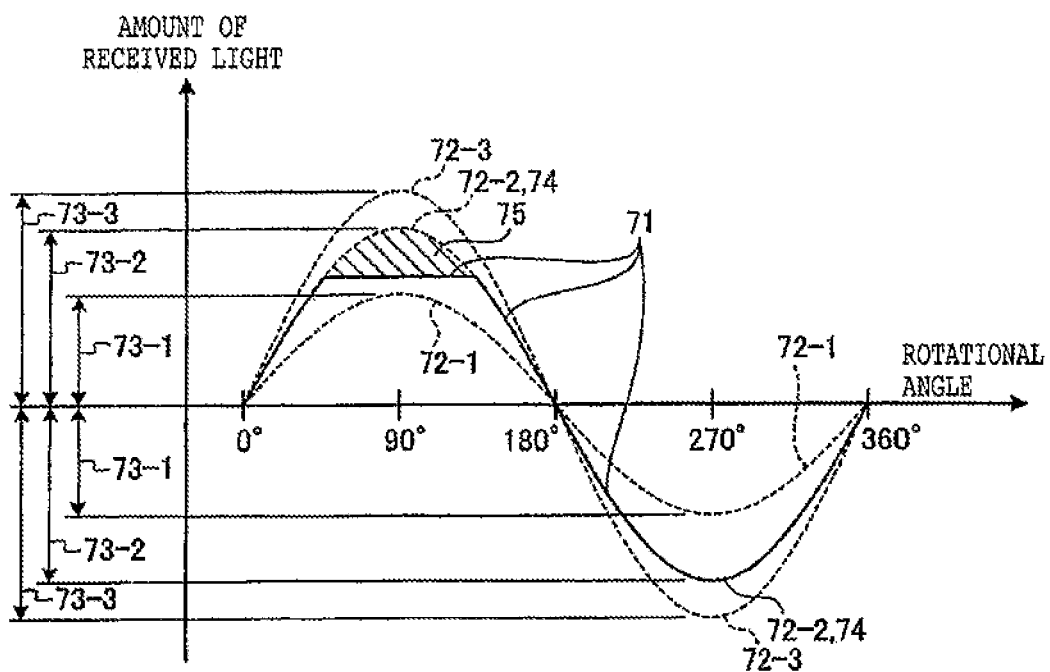
FIG. 4 is a graph illustrating an example of processing operation of the management unit of the cutting apparatus illustrated in FIG. 1.

As illustrated in FIG. 4, the measured waveform forming section 34 of the control unit 50 forms a measured waveform 71 representing the configuration of the outer circumferential region of the cutting blade 21 on the basis of the amounts of light that are measured by the measuring unit 33 at a plurality of rotational angles of the cutting blade 21. The configuration of the outer circumferential region of the cutting blade 21 refers to a planar configuration of the outer edge of the cutting edge 21-1 of the cutting blade 21.

In the case where outer edges 66-1, 66-2, and 66-3 (see FIG. 5) of the cutting edge 21-1 of the cutting blade 21 are of a substantially circular shape, which is free from a configurational abnormality representing an outer edge portion worn to a larger extent than the other outer edge portion, and the cutting blade 21 is mounted on the spindle 22 with respective desired eccentricities 67-1, 67-2, and 67-3, the comparative waveform forming section 35 of the control unit 50 forms a plurality of comparative waveforms 72-1, 72-2, and 72-3 (see FIG. 4) representing the planar configurations of the outer edges 66-1, 66-2, and 66-3 of the cutting edge 21-1 of the cutting blade 21 on the basis of the amounts of light that are measured by the measuring unit 33. The ideal waveform recognizing section 36 of the control unit 50 recognizes the comparative waveform 72-2 that has the greatest number of waveform regions similar to the measured waveform 71 as an ideal waveform 74, as illustrated in FIG. 4, among the comparative waveforms 72-1, 72-2, and 72-3 formed by the comparative waveform forming section 35 using the respective eccentricities 67-1, 67-2, or 67-3 that are varied stepwise by the ideal waveform recognizing section 36.

A configurational abnormality of the planar configuration of the outer edge of the cutting edge 21-1 of the cutting blade 21 refers to a deviation of the planar configuration of the outer edge of the cutting blade 21 from a circular shape. More specifically, the planar configuration of the outer edge of the cutting blade 21 is superposed on a circle closest to the planar configuration, and a configurational abnormality occurs if the area of a region where there is a difference between the planar configuration and the circle exceeds a predetermined value. If the planar configuration of the outer edge of the cutting blade 21 has no configurational abnormality, then the planar configuration of the outer edge of the cutting blade 21 is referred to as normal. The predetermined value is determined on the basis of the area of the region where there is a difference between the planar configuration of the outer edge of any cutting blade 21 that has no processing quality problem and a circle closest to the planar configuration of the outer edge of the cutting blade 21.

An eccentricity refers to the amount of a deviation between the rotational axis of the spindle 22 on which the cutting blade 21 is mounted and the center of the cutting blade 21. Since the diameter of the insertion hole 61 in the cutting blade 21 is slightly larger than the diameter of the boss on the spindle 22 inserted in the insertion hole 61, a slight clearance tends to occur between the cutting blade 21 and the spindle 22 when the cutting blade 21 is mounted on the spindle 22, developing an eccentricity therebetween when the spindle 22 is rotated about its central axis.

Figure 5:
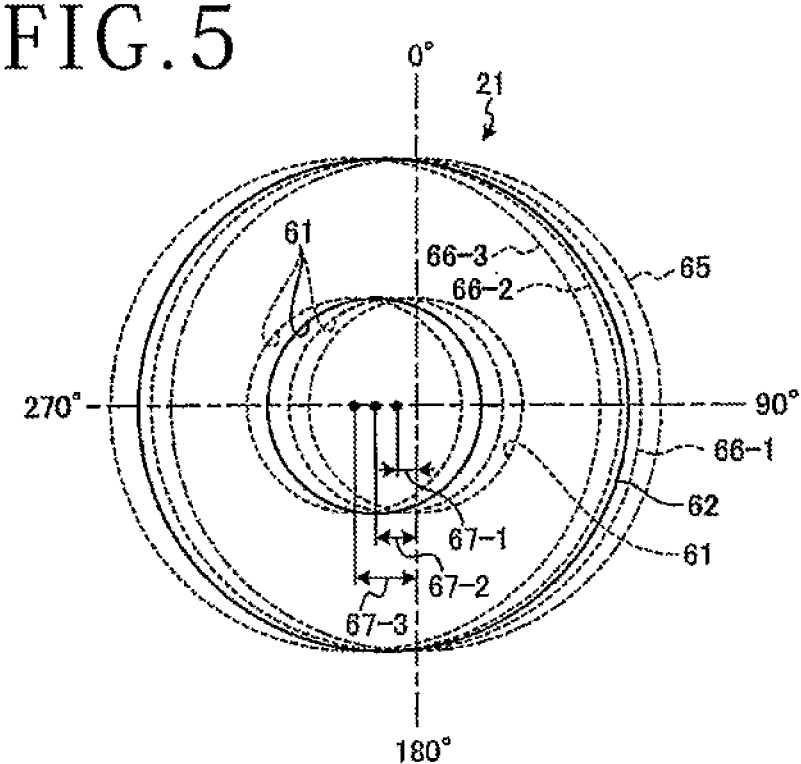
FIG. 5 is a plan view illustrating the configuration of the outer circumferential region of a cutting blade used in the cutting apparatus illustrated in FIG. 1.

The amount of light measured by the measuring unit 33 decreases in an angular range where an outer edge 62 of the cutting edge 21-1 of the cutting blade 21 protrudes radially outwardly away from the center of rotation of the cutting blade 21, and increases in an angular range where the outer edge 62 is dented or recessed radially inwardly toward the center of rotation of the cutting blade 21. Therefore, the measured waveform 71 represents the planar configuration of the outer edge 62 of the cutting edge 21-1 of the cutting blade 21 mounted on the spindle 22. In the case where the center of the cutting blade 21 is not eccentric with respect to the center of the spindle 22 and the planar configuration of an outer edge 65 of the cutting edge 21-1 is of a substantially circular shape free of any configurational abnormality, as illustrated in FIG. 5, the amount of light measured by the measuring unit 33 is constant regardless of the rotational angle of the cutting blade 21. Furthermore, in the case where the center of the cutting blade 21 is eccentric with respect to the center of the spindle 22 and the planar configurations of the outer edges 66-1, 66-2, and 66-3 of the cutting edge 21-1 are of a substantially circular shape free of any configurational abnormality, as illustrated in FIG. 5, the amount of light measured by the measuring unit 33 is represented by sine waves having respective amplitudes 73-1, 73-2, and 73-3 depending on the eccentricities 67-1, 67-2, and 67-3 as illustrated in FIG. 4.

A region where the comparative waveforms 72-1, 72-2, and 72-3 agree with the measured waveform 71 refers to an angular range where the difference between the amounts of light corresponding to the comparative waveforms 72-1, 72-2, and 72-3 and the amount of light corresponding to the measured waveform 71 is smaller than a predetermined value. The predetermined value is determined on the basis of the difference between the measured waveform 71 representing any cutting blade 21 that has no processing quality problem and the ideal waveform 74.

The difference calculating section 37 calculates the area of a region 75 illustrated in FIG. 4 that represents the difference between the measured waveform 71 and the ideal waveform 74 that are superposed on each other. The area of the region 75 represents a quantization of the extent to which the planar configuration of the outer edge 62 of the cutting blade 21 deviates from a circular shape. If the difference between the measured waveform 71 and the ideal waveform 74 exceeds a predetermined value, i.e., a threshold value, then the determining section 38 of the control unit 50 determines that the planar configuration of the outer edge 62 of the cutting edge 21-1 of the cutting blade 21 has a configurational abnormality. The predetermined value is determined on the basis of the area of the region 75 that represents the difference between the measured waveform 71 representing any cutting blade 21 that has no processing quality problem and the ideal waveform 74 superposed on the measured waveform 71.

The comparative waveform storage section 39 of the control unit 50 stores the desired eccentricities 67-1, 67-2, and 67-3 and the comparative waveforms 72-1, 72-2, and 72-3 in association with each other at each instance of the positional relationship between the cutting blade 21 and the grooved member 28.

The control unit 50 controls the various components of the cutting apparatus 1 to enable the cutting apparatus 1 to perform various kinds of operation for processing the workpiece 100 and various kinds of operation for determining the configuration of the cutting blade 21. According to the first embodiment, the control unit 50 includes a computer system having an arithmetic processing apparatus including a microprocessor such as a central processing unit (CPU), a storage apparatus having a memory such as a read only memory (ROM) or a random access memory (RAM), and an input/output interface. The arithmetic processing apparatus performs arithmetic processing operation according to computer programs stored in the storage apparatus and outputs control signals for controlling the cutting apparatus 1 through the input/output interface to the various components of the cutting apparatus 1.

The functions of the measured waveform forming section 34, the comparative waveform forming section 35, the ideal waveform recognizing section 36, the difference calculating section 37, and the determining section 38 are realized by the arithmetic processing apparatus of the control unit 50 as it executes the computer programs stored in the storage apparatus. The comparative waveform storage section 39 is implemented by the storage apparatus of the control unit 50.

The cutting apparatus 1 further includes a display unit 51 and an indicator lamp 52. The display unit 51 may be a liquid crystal display apparatus or the like for displaying states and images of processing operation. The display unit 51 is controlled by the control unit 50 to switch images to be displayed thereon. The display unit 51 displays determined results from the determining section 38 to indicate them to the operator of the cutting apparatus 1. The indicator lamp 52 is turned on by being controlled by the control unit 50. When the indicator lamp 52 is turned on, it indicates the determined results from the determining section 38 to the operator of the cutting apparatus 1.

Operation of the cutting apparatus 1 according to the first embodiment will be described below. According to the first embodiment, after the cutting blade 21 has been replaced, after the cutting blade 21 has been dressed, or prior to or during a cutting step using the cutting blade 21, the cutting apparatus 1 carries out a step of determining the planar configuration of the outer edge 62 of the cutting edge 21-1 of the cutting blade 21 mounted on the distal end of the spindle 22 (hereinafter referred to as a "step of determining the configuration of the cutting blade 21").

Figure 6:
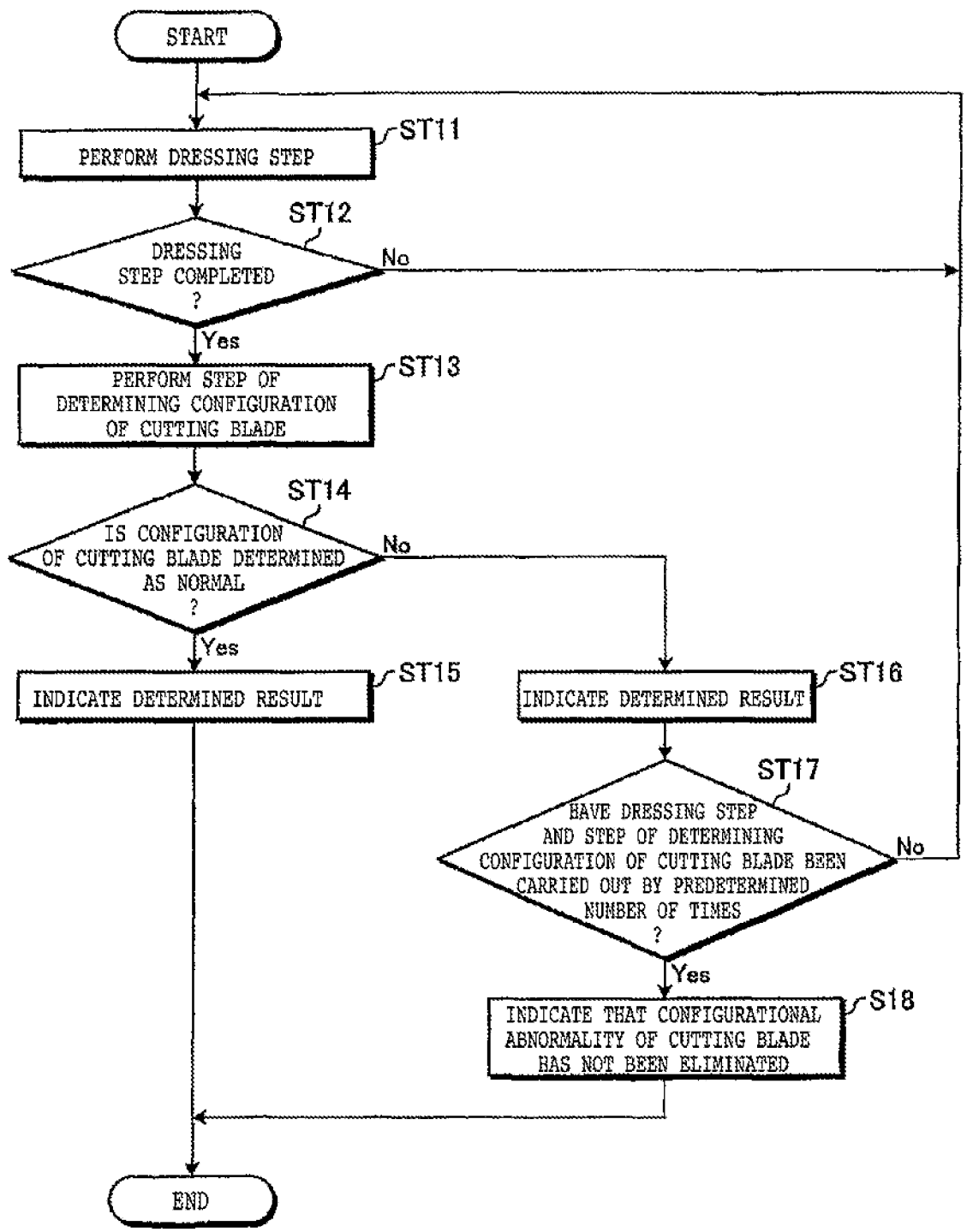
FIG. 6 is a flowchart illustrating by way of example an operation sequence of the cutting apparatus illustrated in FIG. 1.

FIG. 6 is a flowchart illustrating by way of example an operation sequence of the cutting apparatus 1 illustrated in FIG. 1. As illustrated in FIG. 6, the cutting apparatus 1 performs a dressing step for dressing the cutting blade 21 by causing the cutting edge 21-1 of the cutting blade 21 to cut into the dressing board 150 held on the holding surface 16 of the sub-chuck table 15 in step ST11. When the dressing step is completed in step ST12 (Yes), the cutting apparatus 1 performs the step of determining the configuration of the cutting blade 21 in step ST13.

In the step of determining the configuration of the cutting blade 21, the control unit 50 first controls the lifting and lowering member 29 to adjust the vertical position of the grooved member 28 in order to position the cutting blade 21 between the light emitter 31 and the light receiver 32. Next, the control unit 50 rotates the cutting blade 21 about its central axis, controls the light emitter 31 to emit light, controls the light receiver 32 to receive the light emitted from the light emitter 31, and controls the measuring unit 33 to measure the amount of light received by the light receiver 32.

The measured waveform forming section 34 analyzes time-depending changes in the amount of light measured by the measuring unit 33, and forms the measured waveform 71 representing the changes in the amount of light at rotational angles of the cutting blade 21, as illustrated in FIG. 4.

After the measured waveform 71 has been formed, the ideal waveform recognizing section 36 varies stepwise the eccentricities 67-1, 67-2, and 67-3 to be used by the comparative waveform forming section 35. Next, the comparative waveform forming section 35 forms the comparative waveforms 72-1, 72-2, and 72-3 by referring to the comparative waveform storage section 39 on the basis of the eccentricities 67-1, 67-2, and 67-3 determined by the ideal waveform recognizing section 36. The ideal waveform recognizing section 36 then recognizes the comparative waveform 72-2 that has the greatest number of waveform regions similar to the measured waveform 71 as an ideal waveform 74, as illustrated in FIG. 4, among the comparative waveforms 72-1, 72-2, and 72-3 formed by the comparative waveform forming section 35.

After the ideal waveform 74 has been recognized, the difference calculating section 37 calculates the area of the region 75 that represents the difference between the measured waveform 71 and the ideal waveform 74 that are superposed on each other. Then, the determining section 38 determines, on the basis of the area of the region 75 calculated by the difference calculating section 37, that the planar configuration of the outer edge 62 of the cutting edge 21-1 of the cutting blade 21 has a configurational abnormality if the area of the region 75 exceeds the predetermined value and that the planar configuration of the outer edge 62 of the cutting edge 21-1 of the cutting blade 21 is normal if the area of the region 75 is equal to or smaller than the predetermined value.

If the determining section 38 determines that the planar configuration of the outer edge 62 of the cutting edge 21-1 of the cutting blade 21 is normal in the step of determining the configuration of the cutting blade 21 in step ST14 (Yes), then the control unit 50 controls the display unit 51 and the indicator lamp 52 to indicate the determined results from the determining section 38 to the operator of the cutting apparatus 1 in step ST15. The operation sequence is now ended.

If the determining section 38 determines that the planar configuration of the outer edge 62 of the cutting edge 21-1 of the cutting blade 21 has a configurational abnormality in the step of determining the configuration of the cutting blade 21 in step ST14 (No), then the control unit 50 controls the display unit 51 and the indicator lamp 52 to indicate the determined results from the determining section 38 to the operator of the cutting apparatus 1 in step ST16. Then, the control proceeds to ST17.

If the number of times that the dressing step and the step of determining the configuration of the cutting blade 21 have been carried out has not reached a predetermined count in step ST17 (No), then the control returns to step ST11, and the dressing step and the step of determining the configuration of the cutting blade 21 are repeatedly carried out until the predetermined count is reached.

If the number of times that the dressing step and the step of determining the configuration of the cutting blade 21 have been carried out has reached the predetermined count in step ST17 (Yes), then the control unit 50 indicates to the operator of the cutting apparatus 1, with the display unit 51 and the indicator lamp 52, that the configurational abnormality of the planar configuration of the outer edge 62 of the cutting edge 21-1 of the cutting blade 21 has not been eliminated by the dressing step carried out up to the predetermined count in step ST18, prompting the operator to replace the cutting blade 21. Then, the operation sequence is ended.

Since the cutting apparatus 1 arranged as described above according to the first embodiment determines whether the planar configuration of the outer edge 62 of the cutting edge 21-1 of the cutting blade 21 is normal or has an abnormal configuration by quantizing the extent to which the planar configuration of the outer edge 62 of the cutting blade 21 deviates from a circular shape, the cutting apparatus 1 is advantageous in that it allows detection when the planar configuration of the outer edge 62 of the cutting edge 21-1 of the cutting blade 21 has an abnormal configuration that cannot be detected by the technology of Japanese Patent Laid-Open No. Hei 10-055985 which detects an eccentricity abnormality of a cutting blade.

Second Embodiment

Figure 7:
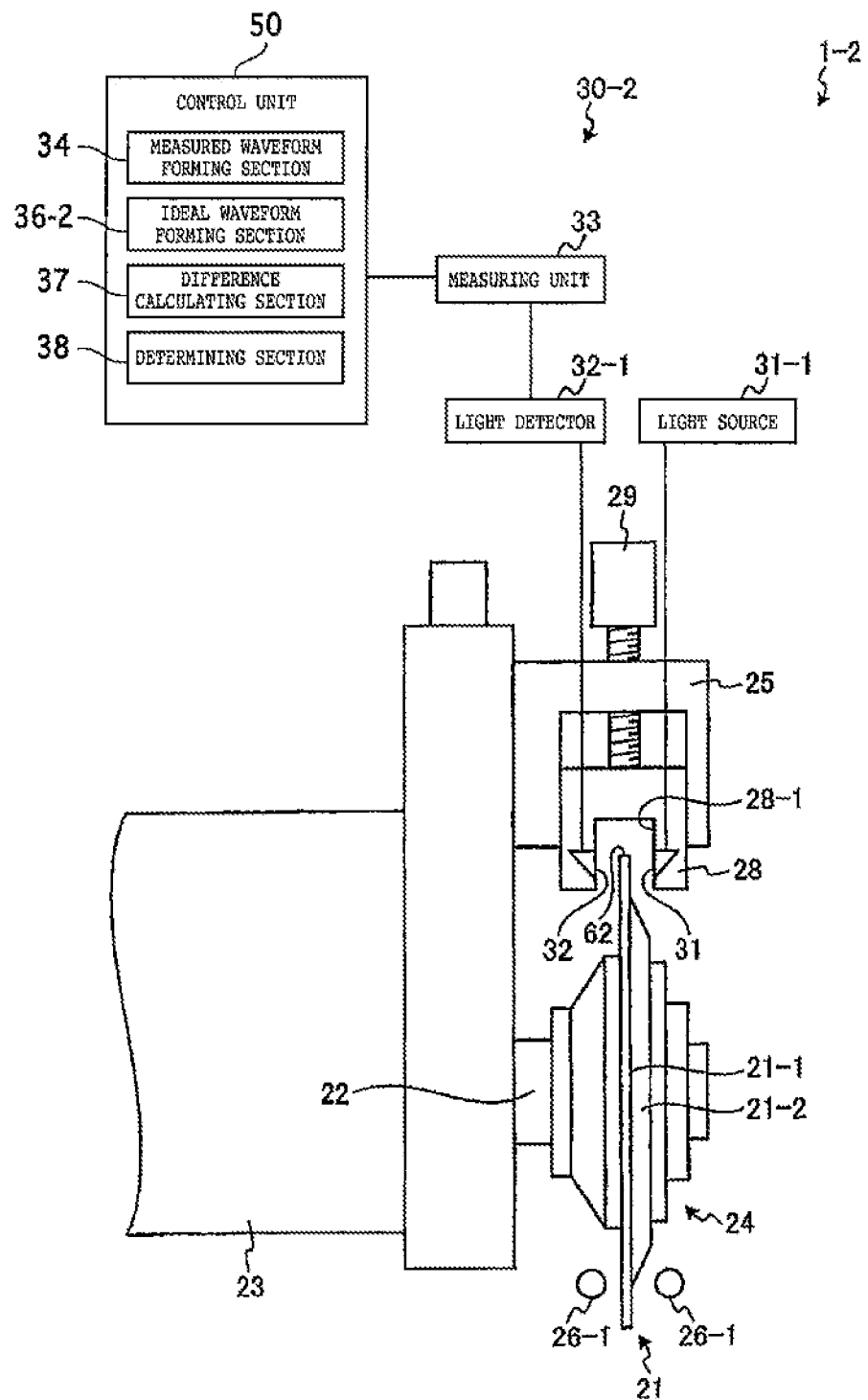
FIG. 7 is a side elevational view of a cutting unit of a cutting apparatus according to a second embodiment of the present invention, with a management unit thereof illustrated in block form.
Figure 8:
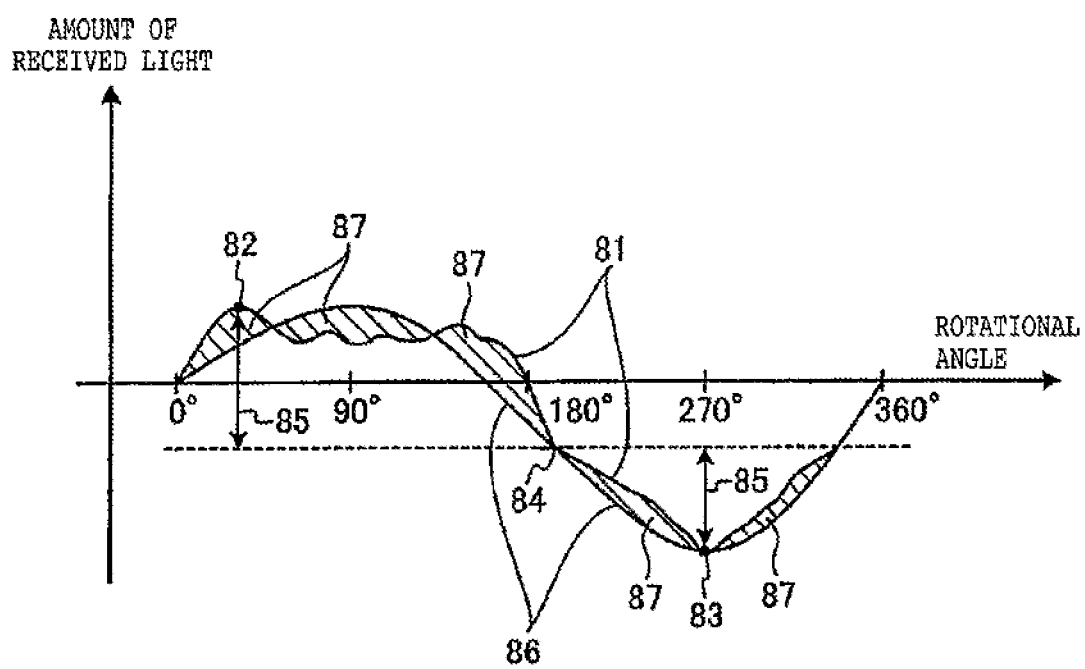
FIG. 8 is a graph illustrating an example of processing operation of the management unit of the cutting apparatus illustrated in FIG. 7.

A cutting apparatus according to a second embodiment of the present invention will be described below with reference to FIGS. 7 and 8. As illustrated in FIG. 7, the cutting apparatus, denoted by 1-2, according to the second embodiment includes a cutting unit 20 and a management unit 30-2. Processing operation of the management unit 30-2 is illustrated in FIG. 8. Those parts illustrated in FIGS. 7 and 8 that are identical to those according to the first embodiment are denoted by identical reference characters and will not be described in detail below.

The cutting apparatus 1-2 according to the second embodiment is different from the cutting apparatus 1 according to the first embodiment in that the management unit 30-2 is used in place of the management unit 30 according to the first embodiment. As illustrated in FIG. 7, the management unit 30-2 includes a control unit 50 that has an ideal waveform recognizing section 36-2 used in place of the comparative waveform forming section 35, the ideal waveform recognizing section 36, and the comparative waveform storage section 39 according to the first embodiment. The ideal waveform recognizing section 36-2 forms an ideal waveform 86 (see FIG. 8) representing the planar configuration of the outer edge 62 of the cutting edge 21-1 of the cutting blade 21 in the case where the planar configuration of the outer edge 62 of the cutting edge 21-1 of the cutting blade 21 does not have a configurational abnormality but is of a circular shape and the cutting blade 21 is mounted on the spindle 22 with a predetermined eccentricity. The function of the ideal waveform recognizing section 36-2 is realized by the arithmetic processing apparatus of the control unit 50 as it executes the computer programs stored in the storage apparatus.

Operation of the cutting apparatus 1-2 according to the second embodiment will be described below. Operation of the cutting apparatus 1-2 according to the second embodiment is similar to operation of the cutting apparatus 1 according to the first embodiment except for the step of determining the configuration of the cutting blade 21. The step of determining the configuration of the cutting blade 21 that is carried out by the cutting apparatus 1-2 according to the second embodiment is similar to the step of determining the configuration of the cutting blade 21 according to the first embodiment up to the point where the measured waveform forming section 34 forms a measured waveform 81.

In the step of determining the configuration of the cutting blade 21 according to the second embodiment, as illustrated in FIG. 8, the ideal waveform recognizing section 36-2 calculates an intermediate value 84 between a maximum value 82 and a minimum value 83 of the measured waveform 81, forms a sine wave whose amplitude is represented by the difference 85 between the intermediate value 84 and the maximum value 82 and between the intermediate value 84 and the minimum value 83, depending on the eccentricity of the cutting blade 21, and recognizes the sine wave as the ideal waveform 86.

After the ideal waveform 86 has been determined, the difference calculating section 37 calculates the areas of regions 87 where there is a difference between the measured waveform 81 and the ideal waveform 86 that are superposed on each other, as with the first embodiment. Then, the determining section 38 determines that the planar configuration of the outer edge 62 of the cutting edge 21-1 of the cutting blade 21 has a configurational abnormality if the sum of the areas of the regions 87 exceeds a predetermined value and that the planar configuration of the outer edge 62 of the cutting edge 21-1 of the cutting blade 21 is normal if the sum of the areas of the regions 87 is equal to or smaller than the predetermined value, as with the first embodiment.

Since the cutting apparatus 1-2 arranged as described above according to the second embodiment determines whether the planar configuration of the outer edge 62 of the cutting edge 21-1 of the cutting blade 21 is normal or has an abnormal configuration by quantizing the extent to which the planar configuration of the outer edge 62 of the cutting blade 21 deviates from a circular shape, as with the cutting apparatus 1 according to the first embodiment, the cutting apparatus 1-2 is advantageous in that it allows detection when the planar configuration of the outer edge 62 of the cutting edge 21-1 of the cutting blade 21 has an abnormal configuration.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A cutting apparatus comprising:
   a chuck table for holding a workpiece thereon;
   a cutting unit for cutting the workpiece held on the chuck table with a cutting blade mounted on a spindle; and
   a management unit for managing the cutting blade mounted on the spindle,
   wherein the management unit includes:
      a light emitter,
      a light receiver facing the light emitter, for receiving light emitted from the light emitter, a measuring unit for measuring an amount of light emitted from the light emitter and received by the light receiver while the cutting blade is positioned between the light emitter and the light receiver, a measured waveform forming section for forming a measured waveform representing a configuration of an outer circumferential region of the cutting blade from the amount of light measured at a plurality of rotational angles of the cutting blade, a comparative waveform forming section for forming a plurality of comparative waveforms representing configurations of the outer circumferential region of the cutting blade, on a basis of amounts of light measured by the measuring unit, wherein the cutting blade is mounted on the spindle with respective desired eccentricities according to each of the plurality of comparative waveforms, an ideal waveform recognizing section for recognizing a comparative waveform that has the greatest number of waveform regions similar to the measured waveform as an ideal waveform, among the plurality of comparative waveforms formed by the comparative waveform forming section using the respective desired eccentricities that are varied stepwise by the ideal waveform recognizing section, a difference calculating section for calculating an area of a region where there is a difference between the measured waveform and the ideal waveform that are superposed on each other, and a determining section for determining that the configuration of the cutting blade is abnormal if the difference exceeds a threshold value.

2. A cutting apparatus comprising:

a chuck table for holding a workpiece thereon;

a cutting unit for cutting the workpiece held on the chuck table with a cutting blade mounted on a spindle; and a management unit for managing the cutting blade mounted on the spindle, wherein the management unit includes:

a light emitter for emitting light, a light receiver facing the light emitter, for receiving the light emitted from the light emitter, a measuring unit for measuring an amount of light emitted from the light emitter and received by the light receiver while the cutting blade is positioned between the light emitter and the light receiver, a measured waveform forming section for forming a measured waveform representing a configuration of an outer circumferential region of the cutting blade from the amount of light measured at a plurality of rotational angles of the cutting blade, an ideal waveform forming section for forming an ideal waveform representing a configuration of the outer circumferential region of the cutting blade, wherein the cutting blade is mounted on the spindle with a predetermined eccentricity, wherein the predetermined eccentricity is a predetermined deviation between a rotational axis of the spindle and a center of the cutting blade, a difference calculating section for calculating an area of a region where there is a difference between the measured waveform and the ideal waveform that are superposed on each other, and a determining section for determining that the configuration of the cutting blade is abnormal if the difference exceeds a threshold value, wherein the ideal waveform forming section calculates an intermediate value between a maximum value and a minimum value of the measured waveform, and forms a waveform whose amplitude is represented by a difference between the intermediate value and the maximum value and between the intermediate value and the minimum value, depending on the predetermined eccentricity of the cutting blade, as the ideal waveform.

\* \* \* \* \*